Feb. 18, 1958 A. C. LUTHER, JR 2,824,225
BAR SIGNAL GENERATOR
Filed April 29, 1954

INVENTOR.
ARCH C. LUTHER, JR.
BY

United States Patent Office 2,824,225

Patented Feb. 18, 1958

2,824,225

BAR SIGNAL GENERATOR

Arch C. Luther, Jr., Merchantville, N. J., assignor to Radio Corporation of America, a corporation of Delaware Application April 29, 1954, Serial No. 426,484

4 Claims. (Cl. 250—27)

This invention relates to television test equipment, and more particularly, to circuits for generating color bar signals for testing colorplexers, color receivers, color monitors and the like.

In present practice, it is essential to have a test signal generator for properly aligning color television apparatus. When the test signal is impressed upon a color television receiver, it should reproduce bars of the primary colors as well as bars combining the primary colors into corresponding complementary colors. It is further desirable to include white bars, or bars of monochrome gray, having at least two degrees of brightness.

An object of this invention is to provide an improved color bar signal generator which is relatively simple and economical to manufacture.

A further object is to provide an improved circuit for a color bar signal generator which is compact and may be adapted for portable use.

According to this invention, triggering pulses are derived from a standard television synchronizing signal. An electronic double-throw switch conveys them alternately into a circuit for generating color bar signals, and then into a circuit for generating white bar signals. The color bar generating circuit comprises three monostable multivibrators, each having different pulse duration times. The multivibrator pulses combine to produce output signals which may be reproduced in a color receiver as bars of the various primary and complementary colors. The white bar generating circuit comprises another multivibrator for producing pulses of equal amplitude for all three output channels. Each of the three output circuits includes a pair of diodes for passing the pulses representative of color bars and the pulses representative of white bars into respective color channels without any direct coupling between the color pulse multivibrators and the monochrome pulse multivibrator.

Figure 1:
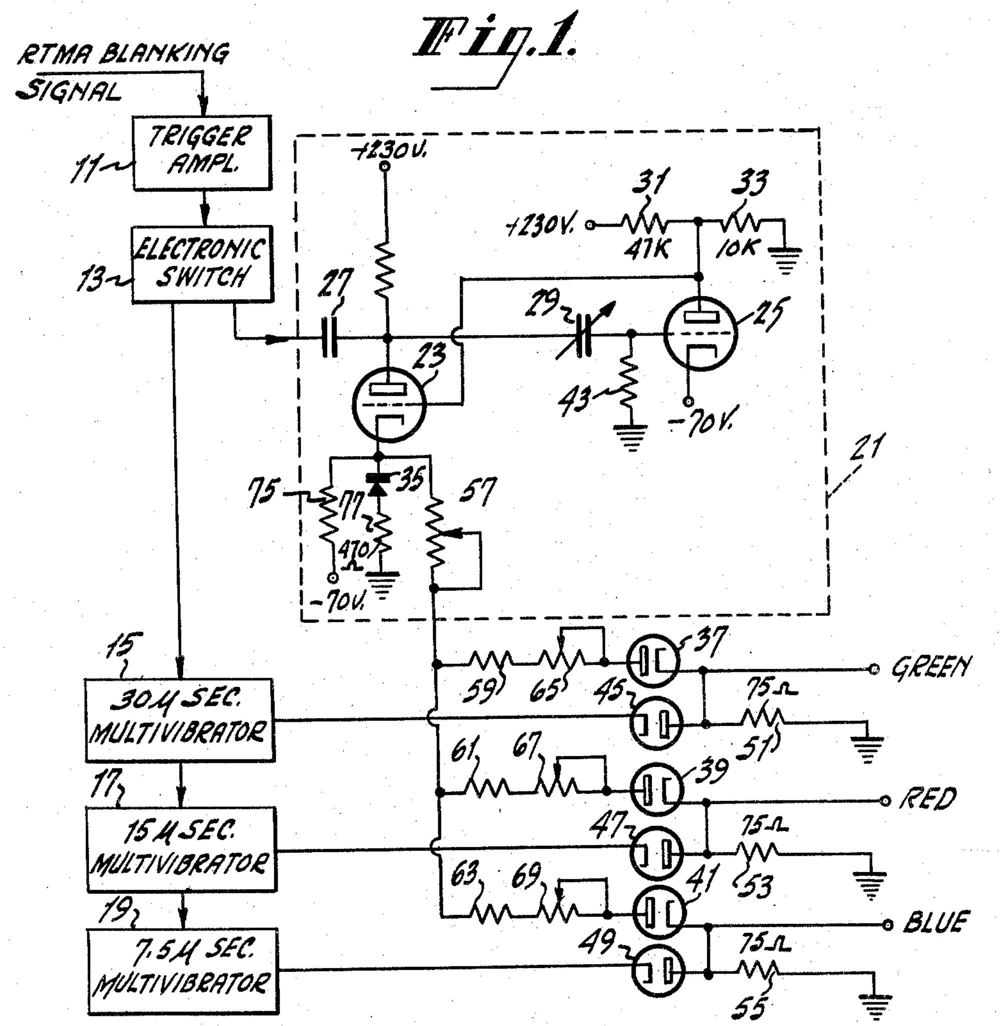
Figure 2:
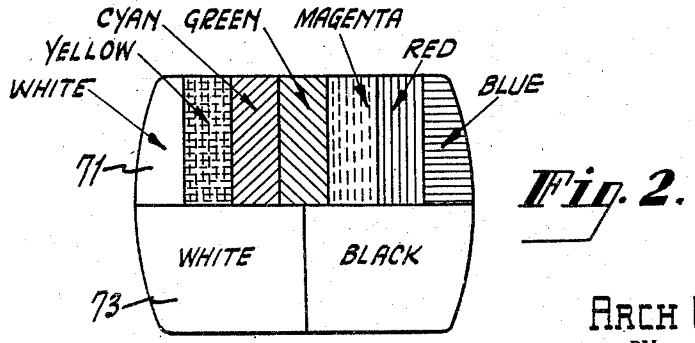

Other objects and advantages of this invention will become apparent upon a reading of the following specification and an inspection of the accompanying drawing in which:

Figure 1 is a circuit diagram, partially in blocks, of the color bar signal generator employing the teachings of this invention; and Figure 2 illustrates the manner in which a color television receiver would reproduce a bar pattern from the signal generated by the bar signal generator of this invention.

Referring again, but in more detail, to Figure 1, there is shown the circuit for a bar signal generator. A standard Radio and Television Manufacturers Association (RTMA) blanking signal is impressed upon a trigger amplifying circuit 11, which has been disclosed in a copending patent application of Arch C. Luther, Jr., Serial No. 383,284, entitled, "Color Bar Signal Generator," filed September 30, 1953. This circuit eliminates the vertical blanking pulses, and differentiates the horizontal blanking pulses of the RTMA signal. The triggering pulses from the trigger amplifier circuit 11 are of negative polarity and correspond with the trailing edge of the horizontal blanking pulses of the RTMA signal.

These triggering pulses are applied to an electronic switch 13, the circuit for which is described in an article entitled, "A High Accurcay Time Division Multiplier," by Edwin A. Goldberg, published in the RCA Review, September 1952. The specific circuit of the electronic switch is shown in page 269, of this periodical.

During the first half of the frame scanning time the electronic switch 13 passes the triggering pulses to a series of three multivibrator circuits, 15, 17, and 19 coupled in tandem. The timing and operation of these multivibrator circuits has been disclosed in the previously cited patent application of this inventor, Serial No. 383,284, filed, September 30, 1953. The first multivibrator 15 produces an output pulse of 30 micro-seconds' duration for activating the green channel of the color television equipment test, while the second multivibrator 17 activates the red channel with pulses of 15 micro-seconds' duration, and the third multivibrator activates the blue channel with 7.5 micro-second pulses.

During the second half of the frame scanning time the triggering pulses are switched by the electronic switch 13 to a white bar multivibrator 21. This circuit is essentially that of the monostable multivibrator as disclosed by the copending application of this inventor, filed March 20, 1953, Serial No. 343,623 and entitled, "Mono-stable Multivibrators." In this circuit the electron tube 23 is normally non-conducting due to the conduction of the second electron tube 25 which holds the grid of the first tube 23 below cutoff potential. A negative triggering pulse applied to the grid of the second tube 25 through the coupling capacitors 27 and 29 cuts off the conduction of the second electron tube 25. The first tube 23, then conducts because its grid potential becomes fixed by a voltage dividing network comprising resistors 31 and 33 which are serially connected between the ground potential and the B+ potential. The amount of conduction of the first electron tube 23 is controlled by its grid potential which is controlled by the relative values of resistors 31 and 33. The first tube 23 performing similarly to a cathode follower, acquires a positive cathode voltage during the pulse time. The duraton of the pulse is determined by the time constant of the capacitor 29 and a resistor 43 which are coupled to the grid of the second electron tube 25. The voltage of the grid of the second electron tube 25 will rise gradually as the capacitor 29 acquires charge until the tube 25 conducts. The pulse duration may be varied by varying the value of the capacitor 29.

Each of the color bar multivibrators 15, 17, and 19 comprises a circuit similar to that shown as multivibrator 21. The pulse outputs from these multivibrators are impressed upon the cathodes of the corresponding diodes 45, 47, and 49 and a one volt potential drop appears across the 75 ohm resistors 51, 53, and 55.

During the first half of the frame scanning time the three multivibrators 15, 17, and 19 combine their pulses to produce a combined output in the three color channels representative of a white pulse together with pulses of each primary color and each complementary color as shown in the top portion of Figure 2. During the latter portion of the frame scanning time the output of the multivibrator 21 produces a positive pulse which is conducted through the three diodes 37, 39, and 41 into all three color channels thereby producing a monochromatic or white pulse resulting in a bar pattern shown by the lower portion of Figure 2.

The amplitude of the white pulse is controllable by adjustments of the resistance circuits from the cathode of tube 23 to the respective green, blue and red output terminals. The resistive path includes a common variable resistor 57 for controlling the brightness of the white bar, and it also includes the fixed resistors 59, 61 and 63 and the adjustable resistors 65, 67 and 69. Resistors 65, 67 and 69 may be individually adjusted to balance and equalize the individual outputs from the multivibrator 21 to the three color channels. Since the resistances in series with the three diodes of 27, 29 and 31 are great as compared with the contact resistance of the tubes themselves, the aging of these tubes will have essentially no effect upon the output of the color bar generator.

To align, or to otherwise test, color television reproducing equipment, it is desirable that it reproduce at least two white bars having different brightness levels. As shown in Figure 2, one such white bar 71 is obtainable from the combined pulse output of the three color bar multivibrators 15, 17, and 19. A second white bar 73 results from the pulse output of the white bar multivibrator 21. The level of brightness of the resulting white bar 73 is controllable by varying the voltage of the output pulse from the multivibrator 21. As illustrated in Figure 1, the output voltage of the multivibrator 21 is determined by the voltage of the cathode of the first electron tube 23, normally this tube 23 is non-conducting and its cathode voltage is determined by a potential dividing network comprising the diode rectifier 35 and two resistors, 75, and 77. With the electron tube 23 in its normal non-conducting state, the output voltage from the multivibrator 21 is negative and when impressed upon the anodes of the coupling diodes 37, 39 and 41 these diodes remain cut off and no signal reaches the green, red and blue output terminals.

When the multivibrator 21 receives a triggering pulse, the first electron tube 23 becomes conducting and the diode rectifier 35 is then cut off. The voltage of the cathode of the electron tube 23 is now determined by the amount of conduction and the potential drop across the resistor 75. The amount of conduction of this tube 23 may be determined by the potential dividing resistor network including resistors 31, and 33 which establish a predetermined voltage upon the grid of tube 23. Therefore it would be possible to control the amount of conduction and hence the voltage output from the cathode of tube 23 by varying the values of resistors 31 and 33. If resistors 31 and 33 were replaced by a potentiometer, this potentiometer could function as a brightness control for the white bar 73. Another means for controlling the voltage output of the multivibrator 21 and hence the brightness of the white bar 73 is the insertion of a variable resistor 57 in series with the cathode output of this multivibrator 21.

Although the various electron tubes shown in the drawing and described in the foregoing specification have been indicated as simple single structure tubes, it will be appreciated that the use of dual purpose tubes with multistructures within a single envelope would produce the same result and may be more desirable in practice.

Having thus described the invention, what is claimed is:

1. A device for generating bar signals for testing color television apparatus having a plurality of color channels, said device comprising a means for developing triggering pulses, a first pulse generating circuit, a second pulse generating circuit, means connected to both said first and second pulse generating circuits for switching said triggering pulses alternately and at a fixed rate into said first pulse generating circuit and said second pulse generating circuit, said first pulse generating circuit comprising a plurality of multivibrators corresponding to the plurality of color channels in said color television apparatus, said plurality of multivibrators being operative in response to said triggering pulses to generate output pulses representative of the plurality of colors, said second pulse generating circuit comprising a multivibrator which is operative in response to said triggering pulses to generate pulses representative of white bars, said switching means operating to actuate said first and second pulse generating circuits alternately such that only one of said pulse generating circuits is operative to produce pulses during any given interval, a plurality of output circuits corresponding to the plurality of color channels of color television apparatus, each of said output circuits including a first diode and a second diode, said first diode being coupled to the first of said pulse generating circuits, said second diode being coupled to the second of said pulse generating circuits, said diodes being operative to pass the pulse outputs from the pulse generating circuits to the corresponding color channels of said color television apparatus.

2. The apparatus of claim 1 wherein said output circuit comprises a plurality of pairs of diodes, one diode from each pair being coupled to said color bar pulse generating means, a second diode of each of said pairs being coupled to said white bar pulse generating means, said plurality of pairs of diodes being operative to receive pulses from either of said pulse generating means without feeding said pulses back to the other of said bar pulse generating means.

3. Apparatus for generating bar signals for testing color television receiving equipment having a plurality of color channels, said apparatus comprising in combination means for generating pulses representative of color bars, said color bar pulses being timed to furnish pulses individually to each of said color channels and also being timed to furnish pulses simultaneously to two or more of said color channels, a means for generating pulses representative of white bars, said white bar pulse generating means being connected to furnish pulses simultaneously to each of said plurality of color channels, said white bar pulse generating means including means common to said plurality of color channels for collectively controlling the amplitude of pulses furnished to each of the plurality of color channels, and means for individually adjusting the amplitude of pulses in each color channel.

4. A color bar signal generator for testing color television apparatus, said generator comprising: a plurality of output terminals corresponding respectively to color channels of such apparatus; a plurality of pulse-sources equal in number to the number of output terminals, said pulse-sources forming a color bar generator; means connecting said pulse-sources to respective ones of said terminals; a further source of pulses for producing a second set of pulses; coupling means for applying pulses from said further source to each of said terminals; a source of trigger signals for actuating said sources of pulses; and switch means coupled between said source of trigger signals, on the one hand, and said color bar generator pulse sources and said further source of pulses, on the other hand, for alternately applying actuating trigger signals to said color bar generator and to said further source of pulses, said switch means operating to actuate said color bar generator pulse sources during alternate intervals and further source of pulses during intervening intervals.

References Cited in the file of this patent

UNITED STATES PATENTS

| | | |
|---|---|---|
| 2,513,910 | Bliss | July 4, 1950 |
| 2,592,228 | Adams | Apr. 8, 1952 |
| 2,600,919 | Pritchard | June 17, 1952 |
| 2,644,887 | Wolfe | July 7, 1953 |